Sept. 15, 1942. C. H. PRANGE 2,295,864
ARTIFICIAL TOOTH
Filed Jan. 4, 1941
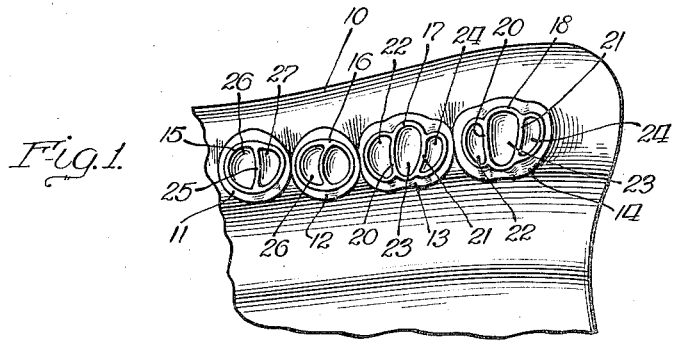
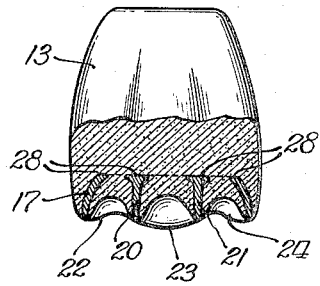
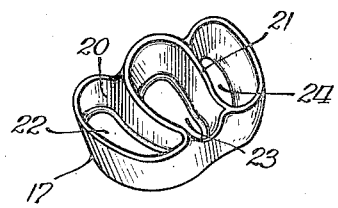
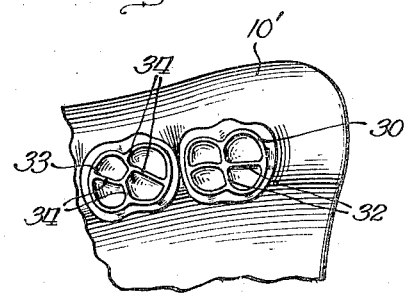
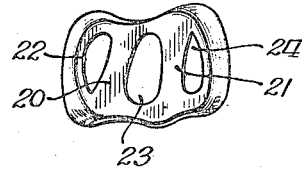
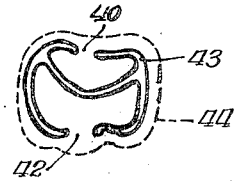
INVENTOR.
Charles H. Prange Patented Sept. 15, 1942

2,295,864

UNITED STATES PATENT OFFICE 2,295,864

ARTIFICIAL TOOTH

Charles H. Prange, Short Hills, N. J., assignor to Dental Research Corporation, Chicago, Ill., a corporation of Illinois Application January 4, 1941, Serial No. 373,059

5 Claims. (Cl. 32—8)

This invention relates to artificial teeth and, more particularly, to an improvement in the occlusal or masticating portions thereof.

The invention overcomes, in particular, difficulties in teeth made of synthetic resin, provides highly advantageous results in conjunction with such teeth, and will be referred to in connection therewith.

The use of synthetic resin for making artificial teeth is advantageous in a number of respects. The denture base material will combine with the resin of the teeth to make a sort of welded bond, so that the final denture may be considered as practically made of one piece. This increases the strength of the denture, and also makes it more sanitary by eliminating crevices. It also eases the construction of dentures in close bite cases because the teeth may be ground down as much as desired without regard to preserving the rentention means. This is in contrast to porcelain teeth which do not develop a definite bond with the denture base material except in so far as retention is afforded, for example, by undercuts and by roughening and sand-blasting of the surface. There is always a possibility of a crevice and seepage occurring, and reliance has to be placed upon mechanical retention in order to keep the teeth from falling out.

Moreover, with resin teeth, a considerable lightening of weight is secured. This is in contrast to porcelain teeth which are heavier and make up a considerable part of the weight of a finished denture.

Porcelain teeth have a tendency to click in masticating or talking, and this tendency is very largely eliminated by resin teeth.

Moreover, the production of resin teeth is relatively simple because no high temperature processes are involved, and accurate temperature control is not required. Also, it is easily possible to produce very good color effects, both by shading the resin itself and also by staining of the finished teeth. Excellent aesthetic effects may be achieved at low cost.

Resin teeth as heretofore proposed, however, have the objection that they are much inferior in hardness. The abrasion of mastication rapidly wears off any sharp cutting edges. This applies to some extent to porcelain teeth also, because dentists, in certain instances, like to have relatively sharp cutting edges, particularly for posterior teeth, and it is impractical to produce these in porcelain without the danger of chipping in use.

It is in point here to state that metal teeth and metal cusps are quite old in the art, not only in denture construction but also in bridge work.

Metal teeth have the objection of increased weight, and the aesthetic effects thereof are not as satisfactory as desired. The types of metal cusps and occlusal portions heretofore provided have also required considerable metal in the mouth, with the increased weight and less desirable aesthetic effects thereof.

Metal teeth and the types of metal cusps and occlusal portions heretofore provided have also had the objection of not being adapted to be ground down without destroying the desired sharp cutting edges. The dentist usually must grind down artificial teeth to make them register or cooperate properly with the other teeth, particularly the opposing teeth. If the metal teeth and the types of metal cusps and occlusal portions heretofore provided are ground down to any extent, solid metal or large areas of metal surface are presented which necessitates recarving the anatomy of the teeth, particularly along the occlusal portions. Most dentists are unable to do this without expending excessive time and effort.

One of the main objects of the present invention is to provide an improved occlusion for artificial teeth, especially for artificial teeth formed of synthetic resin or the like, and, more particularly, the invention provides cutting edges of improved form and characteristics, namely, cutting edges which are of a hardness greater than the hardness of the tooth, of relatively thin and sharp form, and of a character to permit the occlusal portion of the tooth to be ground down if and as desired, while at the same time maintaining the relatively thin and sharp character of the cutting edges.

Another object of the invention is to provide a cutting edge forming insert, preferably metallic, of a character to accomplish the results set forth and applied to the tooth or group of teeth in such a manner that the cutting edges only of the insert are exposed, the metal being concealed to the greatest extent possible with highly desirable aesthetic effects, while at the same time preserving the efficiency of the metallic cutting edges.

Another object of the invention is to provide a cutting edge forming insert of improved form and of a character to provide the advantages set forth and such other advantages as will hereinafter appear; also an insert of such character that the inferior hardness of the tooth body will be exposed to form relatively softer cusp portions at the occlusal surface of the tooth in combination with the relatively hard, thin, and sharp cutting edges, these relatively softer cusp portions being adapted to be ground away if and as desired to form or restore the inverted cusp formation, and adapted, if not so ground, automatically to wear away due to the natural wear resulting from the abrasion of mastication to cause the cutting edges to project as in the original tooth.

Another object of the invention is to provide an improved occlusion for artificial teeth of the character set forth which is of simple and relatively inexpensive construction, may be conveniently applied, is effective for the purposes set forth, and provides an improved appearance in the mouth.

Further and more detailed objects and advantages of the invention will appear from the following detailed description taken in connection with the accompanying drawing, in which:

Figure 1 is a fragmentary bottom plan view of an upper plate made with teeth embodying the present invention;

Figure 2 is a front view of one of the teeth, partially in section;

Figure 3 is a perspective view of the cutting edge forming insert;

Figure 4 is a side view of the form of insert shown in Figures 1, 2, and 3;

Figure 5 is a top plan view of the form of insert shown in Figures 1 to 4, inclusive;

Figure 6 is a fragmentary view similar to Figure 1, showing different forms of cutting edge forming inserts; and Figure 7 is a view looking toward the cutting edge of another form of insert embodying the present invention.

Referring now in detail to the drawing, the reference character 10 (Figure 1) indicates fragmentarily a denture base or plate which may be formed of synthetic resin or any other suitable denture material. The teeth shown at 11, 12, 13, and 14 are the posterior teeth, i. e., the bicuspids and molars. They may be attached to the base or plate 10 in any suitable manner—for example, by molding the base or plate to the teeth.

The teeth are preferably made of synthetic resin or like material, with the advantages already set forth.

The cutting edges of the occlusion of each tooth are shown as formed by inserts 15, 16, 17, and 18, respectively. These inserts are preferably made of metal, and in this respect the denture metal according to United States Patents Nos. Reissue 20,877 and 2,135,600, issued to Austenal Laboratories, Inc., as the assignee of Charles H. Prange, on October 4, 1938 and November 8, 1938, respectively, and known in the art as "Vitallium," is an ideal metal because of its strength and corrosion resistance, its great resistance to abrasive influences, and its other advantageous properties. Suffice it for purposes of the present description to state that this metal or alloy, in its broader aspects, has cobalt as the principal constituent and contains chromium approximately 10% to 40%. More specifically, the allow contains molybdenum or tungsten, and still more specifically the cobalt is present in amount more than 50%. The invention, in its broader aspects, is not limited to cutting edges formed of metal, these cutting edges being adapted to be formed of other material of a hardness greater than the hardness of the body of the tooth. The combination of the metal inserts with teeth formed of synthetic resin, however, produces highly advantageous results.

Referring to the insert 17 shown in detail in Figures 2 to 5, inclusive, this insert, which in general is similar in form to the insert 18, is of open work or grille-like form having the thin and sharp cutting edge defining walls ribbon-like in shape. These thin and sharp or ribbon-like cutting edge defining walls are preferably relatively deep, as shown in Figures 2, 3, and 4, so that if the dentist finds it necessary, the occlusion may be ground down if and as desired and to relatively great extent without destroying the thin and sharp character of the cutting edges.

The inserts are preferably cast to form, but it is to be understood that they may be formed in any other suitable manner and that the particular shape or contour of the cutting edges may vary widely within the scope of the present invention. The invention is primarily useful in so-called mechanical teeth, i. e., teeth having a mechanical as distinguished from a natural occlusion, but it is to be understood that the invention may be embodied in teeth having a natural occlusion. I contemplate, for example, outlining the crests of the cusps of a natural occlusion with the thin, sharp cutting edges of the present invention.

The insert is attached to the occlusal portion of the tooth, preferably by molding the tooth to the insert, the metallic insert being molded into the tooth or into a group of teeth in such manner that the cutting edges of the insert only are exposed, the metal being concealed as shown in Figure 2 to the greatest extent possible, thus providing a highly pleasing appearance or aesthetic effect, while at the same time preserving the efficiency of the metallic cutting edges.

The cutting edge defining walls of the inserts 17 and 18 in the teeth 13 and 14, respectively, are shown as having two integral partitions 20 and 21 defining, with the outer cutting edge defining walls, three openings 22, 23, and 24, with the inferior hardness of the tooth body exposed through these openings to form relatively softer cusp portions at the occlusal surface of the tooth in combination with the relatively hard, thin, and sharp cutting edges. The cutting edge defining walls of the inserts 15 and 16 in the teeth 11 and 12 are shown as having only one integral partition 25 defining, with the outer cutting edge defining wall, a pair of openings 26 and 27 through which the inferior hardness of the tooth material is similarly exposed at the occlusal surface of the tooth. These features may vary widely.

The relatively softer and exposed cusp portions are adapted to be ground away, if and as desired, to form or restore the desired inverted cusp formations. In case the dentist fails to grind away the resin or other relatively softer cusp portions, they will automatically wear away due to the natural wear resulting from the abrasion of mastication, thus causing the cutting edges to project as in the original teeth.

The cutting edge defining walls and the dividing partitions, where such dividing partitions are employed, are preferably inclined or formed at the edges opposite the cutting edges in a manner to secure undercuts and retention in the body of the tooth. In Figure 2 the inner edges of the partitions 20 and 21 are shown as provided with flanged or headed portions, and the outer cutting edge defining wall is shown as having relative inclination along different portions thereof for securing the desired undercuts and retention, at 28, in the body of the tooth. Only a relatively slight amount of retention is required because the inserts are largely under compression in function and there is little tendency to dislodge them from the tooth. The inserts also reenforce the occlusal portions of the tooth, particularly laterally.

It is to be understood that the metal inserts need not necessarily be made separately for each individual tooth, but that sets or groups of two, three, or four, or any other number of teeth may be combined in a unit and the teeth molded in one piece. This would not affect the general operation of the invention, but would simply be a more convenient form of handling the teeth in that the occlusion of these unitary groups could be prearranged according to the conventional or desired occlusal relations.

The combination of the resin tooth with the metal insert provides the advantageous light weight of a resin tooth in combination with the durability of the metal cutting edges of metal teeth or metal cusps or occlusal portions.

In Figure 6, I have shown two different forms of cutting edge forming inserts. The denture base or plate is shown fragmentarily and more or less diagrammatically at 10'. One form of metal insert 30 has a cutting edge defining wall and cross partitions 32. The other form of metal insert 33 has the cutting edge defining wall and differently arranged cutting edge defining partitions 34.

It is to be understood that the metallic cutting edges need not be continuous. These edges may be interrupted as desired—for example, as shown at 40 and 42 in Figure 7, in which the insert is designated 43 in its entirety and the tooth is indicated in dotted lines at 44. I contemplate interrupting the metallic cutting edges of the insert to provide, for example, sluice-ways for the masticated food or for other purposes, as desired.

I have described the invention in connection with the details of particular embodiments, but I do not intend thereby to limit the invention to such embodiments, nor do I intend to be limited to the precise details shown and described.

I claim:

1. An artificial tooth comprising a resinous tooth body and a metal insert fixedly secured in the occlusal portion of said tooth body and of generally ribbon-like form defining a relatively thin, sharp cutting edge along the biting edge of the occlusal surface of the tooth for use in normal masticating use of the tooth, the generally ribbon-like form of said insert being relatively deep so that the occlusion including said relatively thin, sharp cutting edge may be ground without destroying the relatively thin, sharp character of the cutting edge.

2. An artificial tooth comprising a resinous tooth body and a metal insert fixedly secured in the occlusal portion of said tooth body and of generally ribbon-like form defining a relatively thin, sharp cutting edge along the biting edge of the occlusal surface of the tooth for use in normal masticating use of the tooth, the generally ribbon-like form of said insert being relatively deep so that the occlusion including said relatively thin, sharp cutting edge may be ground without destroying the relatively thin, sharp character of the cutting edge, said insert being embedded in the tooth body so that the relatively thin, sharp cutting edge thereof only is exposed to view and extending only partially through the depth of said tooth body.

3. An artificial tooth comprising a resinous tooth body formed with a plurality of cavities in its occlusal surface and a metal insert fixedly secured in the occlusal portion of the tooth body and having relatively thin, ribbon-like portions forming relatively thin, sharp cutting edges outlining said cavities for use in normal masticating use of the tooth.

4. An artificial tooth comprising a synthetic resin tooth body and a metal insert fixedly secured in the occlusal portion of said tooth body and of generally ribbon-like form presenting a relatively thin, sharp cutting edge along the biting edge of the occlusal surface of the tooth for use in normal masticating use of the tooth, said insert comprising an alloy having cobalt as the principal constituent and containing chromium approximately 10% to approximately 40%, and being embedded in the tooth body so that the relatively thin, sharp cutting edge thereof only is exposed to view.

5. An artificial tooth comprising a resinous-like tooth body and a metal insert fixedly secured in the occlusal portion of said tooth body and of generally ribbon-like form defining a relatively thin, sharp cutting edge along the biting edge of the occlusal surface of the tooth for use in normal masticating use of the tooth, said insert being interrupted to provide sluice-ways for masticated food and the like.

CHARLES H. PRANGE.